(12) United States Patent
Grochowski

(10) Patent No.: US 7,854,675 B2
(45) Date of Patent: Dec. 21, 2010

(54) HYDRAULIC FEED SYSTEM FOR A TRANSMISSION

(75) Inventor: Edwin T. Grochowski, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 769 days.

(21) Appl. No.: 11/769,998

(22) Filed: Jun. 28, 2007

(65) Prior Publication Data

US 2009/0005206 A1   Jan. 1, 2009

(51) Int. Cl.
*F16H 61/26* (2006.01)
(52) U.S. Cl. ........................... 475/116; 475/159
(58) Field of Classification Search ............... 475/116, 475/159
See application file for complete search history.

(56) References Cited

U.S. PATENT DOCUMENTS

| 2,077,580 | A | * | 4/1937 | Patterson | 475/70 |
| 2,605,652 | A | * | 8/1952 | Kelbel | 475/116 |
| 2,774,257 | A | * | 12/1956 | Tyler | 475/116 |
| 3,165,946 | A | * | 1/1965 | Wayman | 477/53 |
| 3,475,992 | A | * | 11/1969 | West, Jr. et al. | 475/146 |
| 4,467,669 | A | * | 8/1984 | Kawamoto | 475/66 |
| 5,230,664 | A | * | 7/1993 | Michioka et al. | 474/43 |
| 5,609,538 | A | * | 3/1997 | Nogle et al. | 475/159 |
| 2005/0137044 | A1 | * | 6/2005 | Knowles et al. | 475/116 |
| 2006/0166778 | A1 | * | 7/2006 | Tabata et al. | 475/159 |

\* cited by examiner

*Primary Examiner*—Sherry Estremsky

(57) ABSTRACT

The present invention provides an assembly for use in a transmission that includes a first rotating member having a first portion and a second portion, the second portion having an outer diameter greater than an outer diameter of the first portion and having a bore with an open end. An annulus has a port for providing a fluid and is disposed proximate to the first portion. A second rotating member is at least partially located within the bore and extends from the open end. A first passage is connected to the port of the annulus and a second passage is connected to the first passage. The second passage is located through the second portion. A third passage is connected to the second passage and is located in the second rotating member. Fluid is able to flow from the port through the passages to provide fluid to the second rotating member.

32 Claims, 3 Drawing Sheets

HYDRAULIC FEED SYSTEM FOR A TRANSMISSION

FIELD

The present disclosure relates to transmissions, and more particularly to a hydraulic feed system for a transmission.

BACKGROUND

The statements in this section merely provide background information related to the present disclosure and may or may not constitute prior art.

Automatic transmissions typically include a hydraulic circuit or system that uses a hydraulic fluid, such as oil, for various purposes throughout the transmission. For example, the hydraulic system directs oil to various transmission components to act as lubrication between moving components, to act as a cooling system for dissipating waste heat, and to act as a hydraulic control system for actuating various devices. One typical device that is hydraulically actuated in an automatic transmission is a torque transmitting apparatus such as a clutch or brake. Torque transmitting devices work in combination with other torque transmitting devices and with various gear sets to provide a plurality of forward and reverse gear ratios between an input shaft and an output shaft.

In many applications it is preferable that the input shaft and the output shaft be concentric to one another and share the same axis. Additionally, in order to hydraulically actuate, lubricate, or cool the various components of the transmission, including any torque transmitting devices directly connected to the output shaft, it is preferable that fluid be directed through the input shaft to the output shaft. However, because the input and output shafts must rotate at different speeds, it can be difficult to transfer fluid between the shafts. One solution has been to radially align both the input shaft and the output shaft with a fluid feed port. However, this requires that the output shaft be located within the input shaft and therefore have a smaller outer diameter due to stacking issues with seals and hydraulic fluid galleries. Accordingly, there is room in the art for an assembly with a hydraulic feed system that allows the shafts to have near identical diameters, allows for ninety degree gallery turns, and eliminates the need for seal stacking.

SUMMARY

The present invention provides an assembly for use in a transmission that includes a first rotating member having a first portion and a second portion, the second portion having an outer diameter greater than an outer diameter of the first portion, and the second portion having a bore with an open end. An annulus has at least one port for providing a fluid and is disposed proximate to the first portion of the first rotating member. A second rotating member is at least partially located within the bore and extends from the open end. A first passage is connected to the port of the annulus and a second passage is connected to the first passage. The second passage is located through the second portion of the first rotating member. A third passage is connected to the second passage and is located in the second rotating member. Fluid is able to flow from the port, through the first passage, through the second passage, and to the third passage to provide fluid to the second rotating member.

In one aspect of the present invention, the first passage is defined by a slot located on an outer surface of the second portion of the first rotating member and by an inner surface of the annulus.

In another aspect of the present invention, the third passage extends radially.

In another aspect of the present invention, the second passage extends parallel to an axis of the first and second rotating members.

In another aspect of the present invention, the first rotating member includes a third portion, and the outer diameter of the first portion is greater than an outer diameter of the third portion.

In another aspect of the present invention, the second rotating member includes a first portion and a second portion, the first portion having an outer diameter greater than an outer diameter of the second portion.

In another aspect of the present invention, the outer diameter of the second portion of the second rotating member is approximately equal to the outer diameter of the third portion of the first rotating member.

In another aspect of the present invention, the outer diameter of the first portion of the second rotating member is approximately equal to the outer diameter of the first portion of the first rotating member.

In another aspect of the present invention, the assembly further includes a torque transmitting device coupled to the second rotating member.

In another aspect of the present invention, the assembly further includes a fourth passage located in the second rotating member and connected to the torque transmitting device in order to allow fluid to flow from the port in the annulus to the torque transmitting device.

The present invention further provides an assembly for use in a transmission having a first rotating member having a first portion and a second portion, the second portion having an outer diameter greater than an outer diameter of the first portion, and the second portion having a bore with an open end. An annulus has at least one port for providing a fluid and is disposed proximate to the first portion of the first rotating member. A sleeve is disposed proximate to the second portion of the first rotating member. A second rotating member is at least partially located within the bore and extends from the open end. A first passage is connected to the port of the annulus. A second passage is connected to the first passage and is defined by an inner surface of the sleeve and by a slot located in an outer surface of the second portion of the first rotating member. A third passage is connected to the second passage and extends axially and connects to the second rotating member. Fluid is able to flow from the port, through the first passage, through the second passage, and through the third passage to provide fluid to the second rotating member.

In another aspect of the present invention, the first passage includes a longitudinally extending portion and two radially extending portions, wherein a first of the radially extending portions is connected to the port and a second of the radially extending portions is connected to the second passage.

In another aspect of the present invention, the second passage extends parallel to an axis of the first and second rotating members.

In another aspect of the present invention, the first rotating member includes a third portion, and the outer diameter of the first portion is greater than an outer diameter of the third portion.

In another aspect of the present invention, the second rotating member includes a first portion and a second portion, the first portion having an outer diameter greater than an outer diameter of the second portion.

In another aspect of the present invention, the outer diameter of the second portion of the second rotating member is approximately equal to the outer diameter of the third portion of the first rotating member.

In another aspect of the present invention, the outer diameter of the first portion of the second rotating member is approximately equal to the outer diameter of the first portion of the first rotating member.

In another aspect of the present invention, the assembly further includes a torque transmitting device coupled to the second rotating member.

In another aspect of the present invention, the assembly further includes a fourth passage located in the second rotating member and connected to the torque transmitting device in order to allow fluid to flow from the port in the annulus to the torque transmitting device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
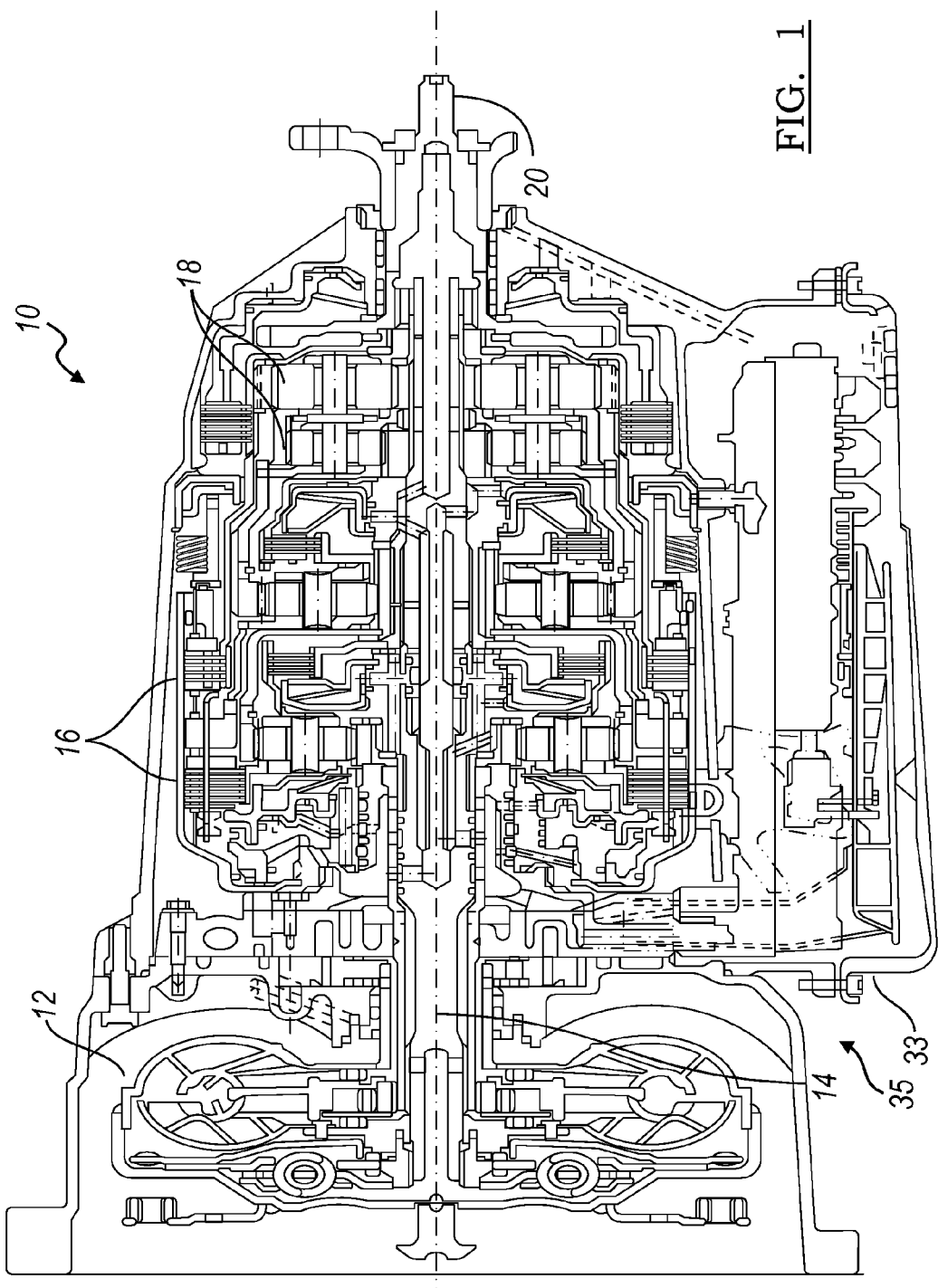
FIG. 1 is a cross-sectional view of an exemplary automatic transmission assembly having a hydraulic feed system according to the principles of the present invention.

With reference to FIG. 1, an exemplary automatic transmission assembly for use in a motor vehicle is illustrated and indicated by reference number 10. The transmission assembly 10 generally includes a torque converter 12 coupled to and driven by an engine (not shown). The torque converter 12 is drivingly coupled to an input shaft assembly or first rotating member 14. The input shaft assembly 14 is drivingly coupled to a plurality of torque transmitting devices 16 and a plurality of gear sets 18. The torque transmitting devices 16 and the gear sets 18 are operable to transmit torque from the input shaft assembly 14 to an output shaft assembly or second rotating member 20 in at least eight forward speed or torque ratios and at least one reverse speed or torque ratio. Each forward and reverse speed or torque ratio is attained by engagement of one or more of the torque-transmitting devices 16. The output shaft assembly 20 is continuously connected with a final drive unit or transfer case (not shown). In the particular example provided, the transmission 10 is illustrated as an 8-speed transmission having five torque transmitting devices 16 and four planetary gear sets 18. However, it should be appreciated that any number of torque transmitting devices 16 and any number and types of gear sets 18 may be employed without departing from the scope of the present invention.

Figure 2:
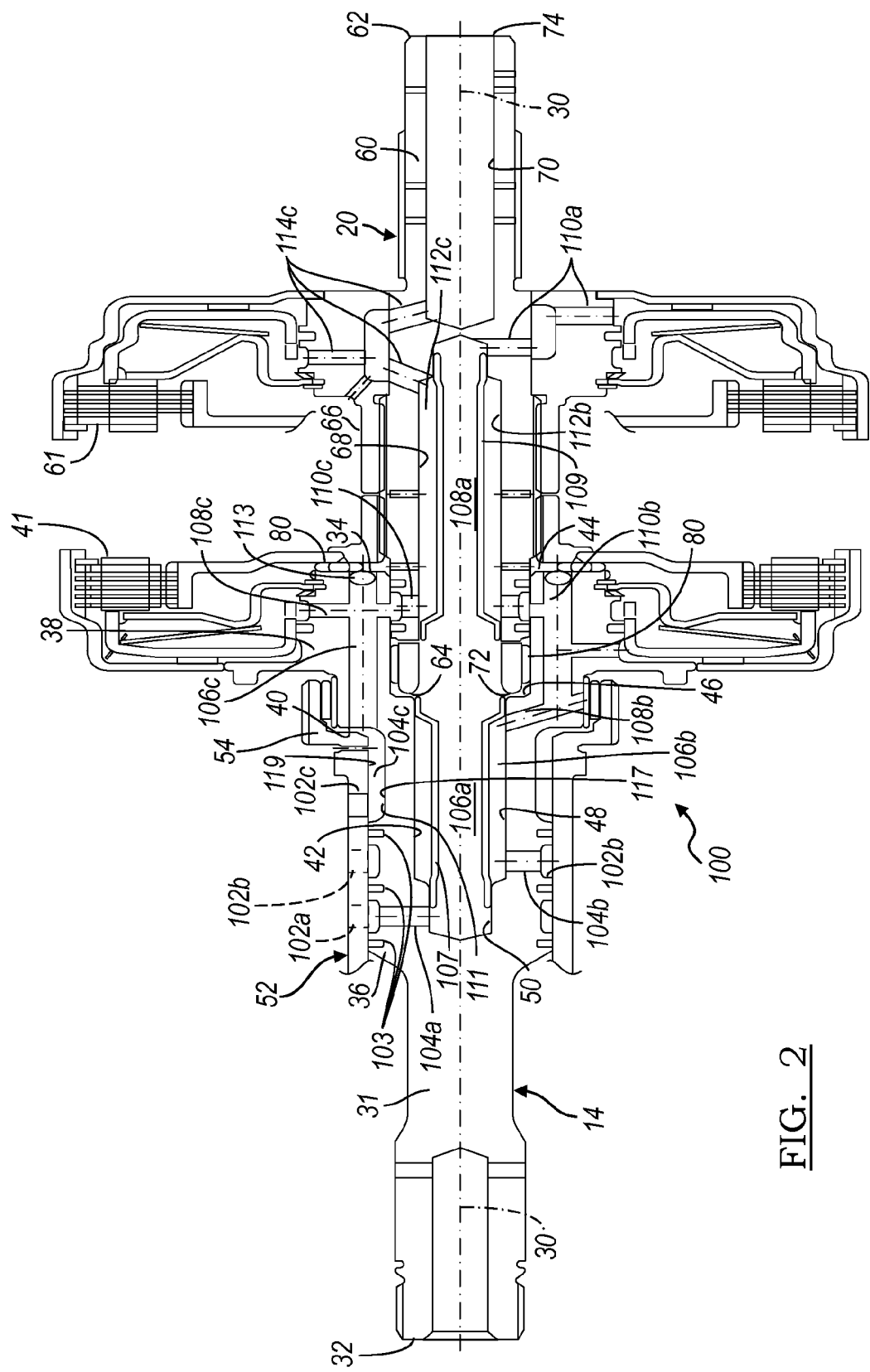
FIG. 2 is an enlarged cross-sectional view of an assembly having a hydraulic feed system according to the present invention.

Turning to FIG. 2, the input shaft assembly 14 and the output shaft assembly 20 will now be described in further detail. The input shaft assembly 14 is generally elongated and defines a longitudinal axis, indicated by reference number 30. The input shaft assembly 14 includes a body portion 31 having a first end 32 that engages the torque converter 12 (FIG. 1) and a second end 34 that is located longitudinally opposite the first end 32.

The input shaft assembly 14 further includes an enlarged first or middle portion 36 and an enlarged second or end portion 38. The end portion 38 is proximate to the second end 34 and has an outer diameter greater than an outer diameter of the middle portion 36 and greater than an outer diameter of the body portion 31. The middle portion 36 has an outer diameter greater than the body portion 31. The middle portion 36 transitions to the end portion 38 at an axially extending step 40. A first torque transmitting device 41 is rotatingly coupled to the end portion 38 of the input shaft assembly 14. Torque that is transmitted from the torque converter 12 (FIG. 1) through the input shaft assembly 14 is in turn transmitted to the first torque transmitting device 41 and on to the remaining torque transmitting devices 16 and gear sets 18.

The input shaft assembly 14 defines a bore 42. The bore 42 is concentric along the axis 30 and extends from an opening 44 in the second end 34 through the end portion 38 and into the middle portion 36. In the example provided, the bore 42 includes three portions: a first portion 46 extending from the opening 44 into the end portion 38, a second portion 48 extending from the end portion 38 into the middle portion 36, and a third portion 50 at an end of the bore 42 opposite the opening 44. The first portion 46 has an outer diameter greater than the outer diameters of the second portion 48 and the third portion 50, and the second portion 48 has an outer diameter greater than the outer diameter of the third portion 50.

An annulus or first sleeve 52 is concentric with a portion of the input shaft assembly 14 in that the annulus 52 is axially aligned with the axis 30 and at least partially overlaps the input shaft assembly 14. The annulus 52 is sized to fit around the outer diameter of the middle portion 36 of the input shaft assembly 14. The annulus 52 also includes an enlarged end portion 54 sized to extend overtop the step 40 and overtop a portion of the end portion 38 of the input shaft assembly 14. The annulus 52 may be either stationary or may rotate relative to the input shaft assembly 14.

The output shaft assembly 20 is axially aligned with the axis 30 and therefore the input shaft assembly 14. The output shaft assembly 20 includes a first portion or body portion 60 having a first end 62 that engages a final drive unit or transfer case (not shown) and a second end 64 that is located longitudinally opposite the first end 62.

The output shaft assembly 20 further includes an enlarged second portion or middle portion 66 located between the first and second ends 62, 64. The middle portion 66 has an outer diameter greater than an outer diameter of the body portion 60. A second torque transmitting device 61 is rotatingly coupled to the middle portion 66. Torque that is transmitted through the gear sets 18 (FIG. 1) is transmittable through the second torque transmitting device 61 and on to the output shaft assembly 20.

The output shaft assembly 20 defines a first bore 68 and a second bore 70. The first bore 68 is aligned with the axis 30 and extends from an opening 72 in the second end 64 through the body portion 60 and into the middle portion 66. The second bore 70 is also aligned with the axis 30 and extends from an opening 74 in the first end 62 through the body portion 60 and partially into the middle portion 66.

The output shaft assembly 20 and the input shaft assembly 14 are coupled together to form an assembly that allows communication of fluid therebetween, as will be described in greater detail below. More specifically, the second end 64 of the output shaft assembly 20 is disposed within the bore 42 of the input shaft assembly 14 such that the body portion 60 of the output shaft assembly 20 is positioned within the first portion 46 of the bore 42 of the input shaft assembly 14. Accordingly, the body portion 60 of the output shaft assembly 20 is concentric with the end portion 38 of the input shaft assembly 14. A plurality of bearings 80 located between the input shaft assembly 14 and the output shaft assembly 20 allow the input shaft assembly 14 and the output shaft assembly 20 to freely rotate relative to one another.

The transmission 10 further includes a hydraulic feed system, indicated by reference number 100, operable to transmit a pressurized fluid, such as oil, through the input shaft assembly 14 and the output shaft assembly 20 to the first and second torque transmitting devices 41, 61, as well as various other locations within the transmission 10. The hydraulic feed system 100 of the present invention forms part of a larger hydraulic system operable to provide pressurized fluid throughout the transmission 10. For example, the hydraulic system also includes a sump 33 (FIG. 1) for storing the fluid, a pump 35 (FIG. 1) for circulating and pressurizing the fluid, and a plurality of galleries or passages, including a valve body, for delivering the fluid throughout the transmission 10.

The hydraulic feed system 100 includes a plurality of fluid feed ports 102A, 102B, and 102C located longitudinally along the annulus 52. The fluid feed ports 102A-C extend through the annulus 52 and are sealed from one another by a plurality of seals 103 located between the annulus 52 and the middle portion 36 of the input shaft assembly 14. Each fluid feed port 102A-C is coupled to a plurality of passages or galleries within the input shaft assembly 14 and the output shaft assembly 20 in order to direct fluid to specific locations within the transmission 10.

For example, the fluid port 102A communicates with or is connected to a first passage or gallery 104A that extends radially through the middle portion 36 of the input shaft assembly 14 and connects with the third portion 50 of the bore 42. The third portion 50 is connected to a second passage 106A that extends longitudinally. The second passage 106A is defined by a tube 107 located within the bore 42 that divides the bore 42 into two separate passages. The second passage 106A communicates through the opening 72 in the second end 64 of the output shaft assembly 20 to a third passage 108A. The third passage 108A is defined by a second tube 109 located within the first bore 68 of the output shaft assembly 20 that divides the first bore 68 into two separate passages. The third passage 108A is connected to a fourth passage 110A that extends radially through the middle portion 66 of the output shaft assembly 20 to the second torque transmitting device 61.

The fluid port 102B is connected to a first passage 104B that extends radially through the middle portion 36 of the input shaft assembly 14 and connects with a second passage 106B that extends longitudinally. The second passage 106B is defined by the tube 107 and the outer diameter of the second portion 48 of the bore 42. The second passage 106B is connected to a third passage 108B that extends radially through the end portion 38 of the input shaft assembly 14. The third passage 108B is connected to a fourth passage 110B that extends longitudinally through the end portion 38. A fifth passage 112B connects the fourth passage 110B to the first torque transmitting device 41.

The fluid port 102C is connected to a first passage 104C. The first passage 104C is defined by an inner surface 119 of the annulus 52 and by a surface 117 formed by an outer diameter 111 of the middle portion 36 of the input shaft assembly 14. The first passage 104C communicates with a second passage 106C. The second passage 106C extends longitudinally through the end portion 38. In the particular example provided, the second passage 106C is bored through the end portion 38 and stopped at an end opposite the first passage 104C by a plug 113. The second passage 106C is located radially outboard of the body portion 60 of the output shaft assembly 20. A third passage 108C connects the second passage 106C to the first torque transmitting device 41. A radially extending fourth passage 110C within the output shaft assembly 20 connects the second passage 106C to a fifth passage 112C. The fifth passage 112C is defined by the tube 109 and the outer diameter of the first bore 68 within the output shaft assembly 20. The fifth passage 112C is connected to a sixth passage 114C that communicates with the second torque transmitting device 61 and with the second bore 70.

While various passages have been specifically described, it should be appreciated that the passages may be considered one passage with various portions without departing from the scope of the present invention. For example, the passages 104C, 106C, and 108C could be considered a single passage located within the input shaft assembly 14, and the passages 110C, 112C, and 114C could be considered a single passage located within the output shaft assembly 20. The hydraulic feed system 100 and the arrangement of the input and output shaft assemblies 14, 20 allows the body portion 60 of the output shaft assembly 20 to have an outer diameter approximately equal to the outer diameter of the body portion 31 of the input shaft assembly 14. Additionally, the outer diameter of the middle portion 66 of the output shaft assembly 20 is approximately equal to the outer diameter of the middle portion 36 of the input shaft assembly 14.

Figure 3:
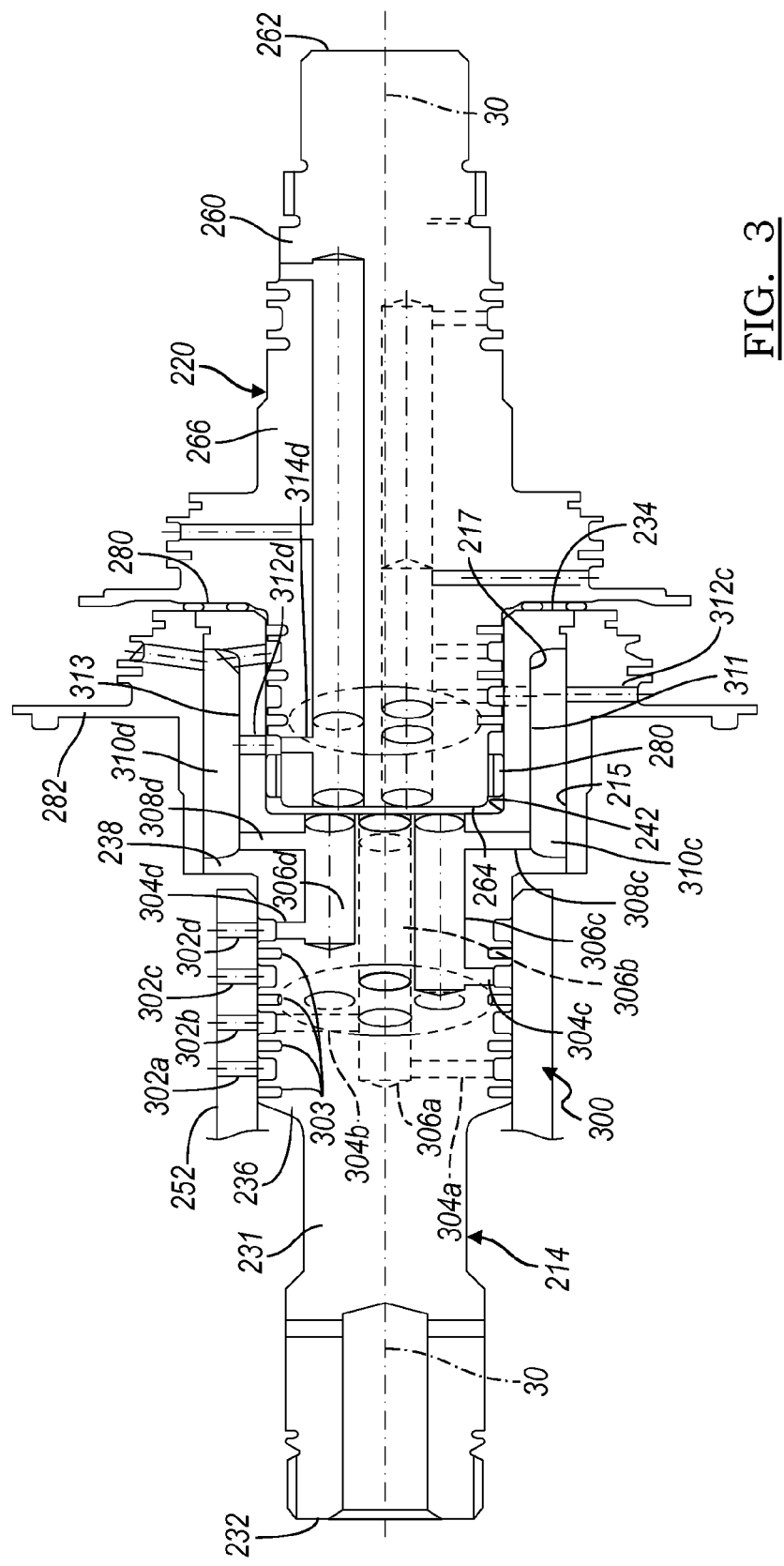
FIG. 3 is an enlarged cross-sectional view of another embodiment of the assembly and hydraulic feed system of the present invention.

Turning now to FIG. 3, an alternate embodiment of the hydraulic feed system 100 is illustrated and generally indicated by reference number 300. The hydraulic feed system 300 is employed with an alternate input shaft assembly 214 and an alternate output shaft assembly 220. The input shaft assembly 214 is similar to the input shaft assembly 14 and includes a first end 232, a second end 234, a body portion 231, a middle portion 236, an end portion 238, and a bore 242. The bore 242 terminates within the end portion 238. The output shaft assembly 220 is also similar to the output shaft assembly 20 and includes a first end 262, a second end 264, a body portion 260, and a middle portion 266.

The output shaft assembly 220 and the input shaft assembly 214 are coupled together to form an assembly that allows communication of fluid therebetween, as will be described in greater detail below. More specifically, the second end 264 of the output shaft assembly 220 is disposed within the bore 242 of the input shaft assembly 214. Accordingly, the body portion 260 is concentric with the end portion 238 of the input shaft assembly 214. A plurality of bearings 280 located between the input shaft assembly 214 and the output shaft assembly 220 allow the input shaft assembly 214 and the output shaft assembly 220 to freely rotate relative to one another.

A first annulus or sleeve 252 is concentric with the first portion 236 of the input shaft assembly 214. The annulus 252 is sized to fit around the outer diameter of the middle portion 236 of the input shaft assembly 214. The annulus 252 may be either stationary or may rotate relative to the input shaft assembly 214. Additionally, a second annulus or sleeve 282 is press fit to an outer diameter of the end portion 238 of the input shaft assembly 214.

The hydraulic feed system 300 is operable to transmit fluid from the input shaft assembly 214 to the output shaft assembly 220. The hydraulic feed system 300 includes a plurality of fluid feed ports 302A, 302B, 302C, and 302D located longitudinally along the annulus 252. The fluid feed ports 302A-D extend through the annulus 252 and are sealed from one another by a plurality of seals 303 located between the annulus 252 and the middle portion 236 of the input shaft assembly 214. Each fluid feed port 302A-D is coupled to a plurality of passages or galleries within the input shaft assembly 214 and the output shaft assembly 220 in order to direct fluid to specific locations within the transmission 10.

For example, the fluid feed port 302A communicates with or is connected to a first passage or gallery 304A that extends radially through the middle portion 236 of the input shaft assembly 214 and connects with a second passage 306A. From the second passage 306A, the fluid may be directed throughout the transmission 10 by various other passages (not shown). Similarly, the fluid feed port 302B is connected to a first passage or gallery 304B that extends radially through the middle portion 236 of the input shaft assembly 214 and connects with a second passage 306B. From the second passage 306B, the fluid also may be directed throughout the transmission 10 by various other passages (not shown).

The fluid port 302C is connected to a first passage 304C that extends radially through the middle portion 236 of the input shaft assembly 214 and connects with a second passage 306C. The second passage 306C extends longitudinally to the end portion 238 and connects with a third passage 308C. The third passage 308C extends radially outward to a fourth passage 310C. The first, second, and third passages 304C, 306C, and 308C may alternative be considered one passage with multiple portions. The fourth passage 310C is defined by an inner surface 215 of the second annulus 282 and by a longitudinal slot 311 located on an outer surface 217 of the end portion 238 of the input shaft assembly 214. A fifth passage 312C is connected to the fourth passage 310C and extends radially outward to communicate fluid to various parts of the transmission 10.

Finally, the fluid port 302D is connected to a first passage 304D that extends radially through the middle portion 236 of the input shaft assembly 214 and connects with a second passage 306D. The second passage 306D extends longitudinally to the end portion 238 and connects with a third passage 308D. The third passage 308D extends radially outward to a fourth passage 310D. The fourth passage 310D is defined by the inner surface 215 of the second annulus 282 and by a longitudinal slot 313 located on the outer surface 217 of the end portion 238 of the input shaft assembly 214. A fifth passage 312D is connected to the fourth passage 310D and extends radially inward to a sixth passage 314D located within the output shaft assembly 220. The sixth passage 314D extends longitudinally along the length of the output shaft assembly 220 to communicate fluid to various parts of the transmission 10.

As noted above, while various passages have been specifically described, it should be appreciated that the passages may be considered one passage with various portions without departing from the scope of the present invention. For example, the passages 304D, 306D, and 308D could be considered a single passage located within the input shaft assembly 14. The hydraulic feed system 300 and the arrangement of the input and output shaft assemblies 214, 220 allows the body portion 260 of the output shaft assembly 220 to have an outer diameter approximately equal to the outer diameter of the body portion 231 of the input shaft assembly 214. Additionally, the outer diameter of the middle portion 266 of the output shaft assembly 220 is approximately equal to the outer diameter of the middle portion 236 of the input shaft assembly 214.

The description of the invention is merely exemplary in nature and variations that do not depart from the gist of the invention are intended to be within the scope of the invention. Such variations are not to be regarded as a departure from the spirit and scope of the invention.

What is claimed is:

1. An assembly for use in a transmission comprising:
   a first shaft defining an axis and having a first portion and a second portion, the second portion having an outer diameter greater than an outer diameter of the first portion, the first portion at least partially defining a first passage and the second portion at least partially defining a second passage, wherein the first passage is in communication with the second passage;
   a sleeve concentric with the first shaft, the sleeve having at least one port for providing a fluid, the at least one port in communication with the first passage; and
   a second shaft aligned with the axis and having a first portion concentric with the second portion of the first shaft, the first portion at least partially defining a third passage in communication with the second passage, and
   wherein the fluid flows from the at least one port, through the first passage, through the second passage, and to the third passage to provide the fluid to the second shaft; and
   wherein the first passage is defined by an outer surface of the first portion of the first shaft and by an inner surface of the sleeve.

2. The assembly of claim 1 wherein the third passage extends radially.

3. The assembly of claim 2 wherein the second passage extends parallel to the axis of the first shaft and the second shaft.

4. The assembly of claim 1 wherein the first shaft includes a third portion, and the outer diameter of the first portion of the first shaft is greater than an outer diameter of the third portion.

5. The assembly of claim 4 wherein the second shaft includes a second portion, and the second portion of the second shaft has an outer diameter greater than an outer diameter of the first portion of the second shaft.

6. The assembly of claim 5 wherein the outer diameter of the first portion of the second shaft is approximately equal to the outer diameter of the third portion of the first shaft.

7. The assembly of claim 6 wherein the outer diameter of the second portion of the second shaft is approximately equal to the outer diameter of the first portion of the first shaft.

8. The assembly of claim 1 further comprising a torque transmitting device coupled to the second shaft.

9. The assembly of claim 8 wherein the second shaft further has a second portion defining a fourth passage in communication with the third passage and in communication with the torque transmitting device and wherein fluid flows from the at least one port, through the first passage, through the second passage, through the third passage, through the fourth passage and to the torque transmitting device.

10. The assembly of claim 1 wherein the sleeve is concentric with the first portion of the first shaft.

11. The assembly of claim 1 wherein the third passage is at least partially defined by a tube located within a bore defined by the second shaft.

12. An assembly for use in a transmission comprising:
    a first shaft defining an axis and having a first portion and a second portion, the second portion having an outer diameter greater than an outer diameter of the first portion, the first portion at least partially defining a first passage;
a first sleeve concentric with the first portion of the first shaft, the first sleeve having at least one port for providing a fluid, the port communicating with the first passage;
a second sleeve concentric with the second portion of the first shaft, the second sleeve and the second portion at least partially defining a second passage in communication with the first passage; and
a second shaft aligned with the axis and having a first portion concentric with the second portion of the first shaft, the first portion at least partially defining a third passage in communication with the second passage; and
wherein fluid flows from the at least one port, through the first passage, through the second passage, and to the third passage to provide fluid to the second shaft.

13. The assembly of claim 12 wherein the second passage is defined by an inner surface of the second sleeve and by a slot located in an outer surface of the second portion of the first shaft.

14. The assembly of claim 12 wherein the first passage includes a longitudinally extending portion and two radially extending portions, wherein a first of the radially extending portions communicates with the at least one port and a second of the radially extending portions communicates with the second passage.

15. The assembly of claim 14 wherein the second passage extends parallel to the axis of the first shaft and the second shaft.

16. The assembly of claim 12 wherein the first shaft includes a third portion, and the outer diameter of the first portion is greater than an outer diameter of the third portion.

17. The assembly of claim 16 wherein the second shaft includes a second portion, the second portion having an outer diameter greater than an outer diameter of the first portion of the second shaft.

18. The assembly of claim 17 wherein the outer diameter of the first portion of the second shaft is approximately equal to the outer diameter of the third portion of the first shaft.

19. The assembly of claim 18 wherein the outer diameter of the second portion of the second shaft is approximately equal to the outer diameter of the first portion of the first shaft.

20. The assembly of claim 12 further comprising a torque transmitting device coupled to the second shaft.

21. The assembly of claim 20 wherein the second shaft further has a second portion defining a fourth passage in communication with the third passage and in communication with the torque transmitting device and wherein fluid is able to flow from the at least one port, through the first passage, through the second passage, through the third passage, through the fourth passage and to the torque transmitting device.

22. An assembly for use in a transmission comprising:
a first shaft defining an axis and having a concentric bore, a first portion and a second portion, the second portion having an outer diameter greater than an outer diameter of the first portion, the first portion at least partially defining a first passage and the second portion at least partially defining a second passage, wherein the first passage is in communication with the second passage;
a sleeve concentric with the first shaft, the sleeve having at least one port for providing a fluid, the at least one port in communication with the first passage; and
a second shaft aligned with the axis and having a first portion disposed within the bore of the first shaft and concentric with the second portion of the first shaft, the first portion at least partially defining a third passage in communication with the second passage; and
wherein the first passage is defined by an outer surface of the first portion of the first shaft and by an inner surface of the sleeve.

23. The assembly of claim 22 wherein the third passage extends radially.

24. The assembly of claim 23 wherein the second passage extends parallel to the axis of the first shaft and the second shaft.

25. The assembly of claim 22 wherein the first shaft includes a third portion, and the outer diameter of the first portion of the first shaft is greater than an outer diameter of the third portion.

26. The assembly of claim 25 wherein the second shaft includes a second portion, and the second portion of the second shaft has an outer diameter greater than an outer diameter of the first portion of the second shaft.

27. The assembly of claim 26 wherein the outer diameter of the first portion of the second shaft is approximately equal to the outer diameter of the third portion of the first shaft.

28. The assembly of claim 27 wherein the outer diameter of the second portion of the second shaft is approximately equal to the outer diameter of the first portion of the first shaft.

29. The assembly of claim 22 further comprising a torque transmitting device coupled to the second shaft.

30. The assembly of claim 29 wherein the second shaft further has a second portion defining a fourth passage in communication with the third passage and in communication with the torque transmitting device and wherein fluid flows from the at least one port, through the first passage, through the second passage, through the third passage, through the fourth passage and to the torque transmitting device.

31. The assembly of claim 22 wherein the sleeve is concentric with the first portion of the first shaft.

32. The assembly of claim 22 wherein the third passage is at least partially defined by a tube located within a bore defined by the second shaft.

* * * * *